United States Patent [19]

Hirosawa et al.

[11] 4,206,346
[45] Jun. 3, 1980

[54] SYSTEM FOR GATHERING DATA REPRESENTING THE NUMBER OF EVENT OCCURRENCES

[75] Inventors: Toshio Hirosawa, Hachioji; Tsugio Momose, Hatano; Shigeo Nagashima, Hachioji, all of Japan

[73] Assignee: Hitachi, Ltd., Tokyo, Japan

[21] Appl. No.: 827,361

[22] Filed: Aug. 24, 1977

[30] Foreign Application Priority Data

Sep. 1, 1976 [JP] Japan .................................. 51/103646

[51] Int. Cl.² .......................... G06M 3/08; G07C 3/10
[52] U.S. Cl. ........................... 235/92 PD; 235/92 DP; 364/900
[58] Field of Search ... 364/200 MS File, 900 MS File; 235/92 CC, 92 DP, 92 ST, 92 PL, 92 SA, 92 EA

[56] References Cited

U.S. PATENT DOCUMENTS

| | | | |
|---|---|---|---|
| 3,588,837 | 6/1971 | Rash et al. | 364/200 |
| 3,704,363 | 11/1972 | Salmassy et al. | 364/200 |
| 3,829,841 | 8/1974 | Steinberg | 364/200 |
| 3,906,454 | 9/1975 | Martin | 364/200 |

*Primary Examiner*—Joseph M. Thesz
*Attorney, Agent, or Firm*—Craig and Antonelli

[57] ABSTRACT

A gathering system in an electronic computer including detecting means for detecting the occurrences of each of a plurality of events, a counter group having a plurality of counters each of which counts the number of occurrences of corresponding event until the number thereof becomes $2^l$, a storage having a plurality of memory areas, each storing $2^{K-l}$ occurrences of the corresponding event and a processing unit for gathering data representative of the number of occurrences of each of the events from the counter and the storage unit.

9 Claims, 8 Drawing Figures

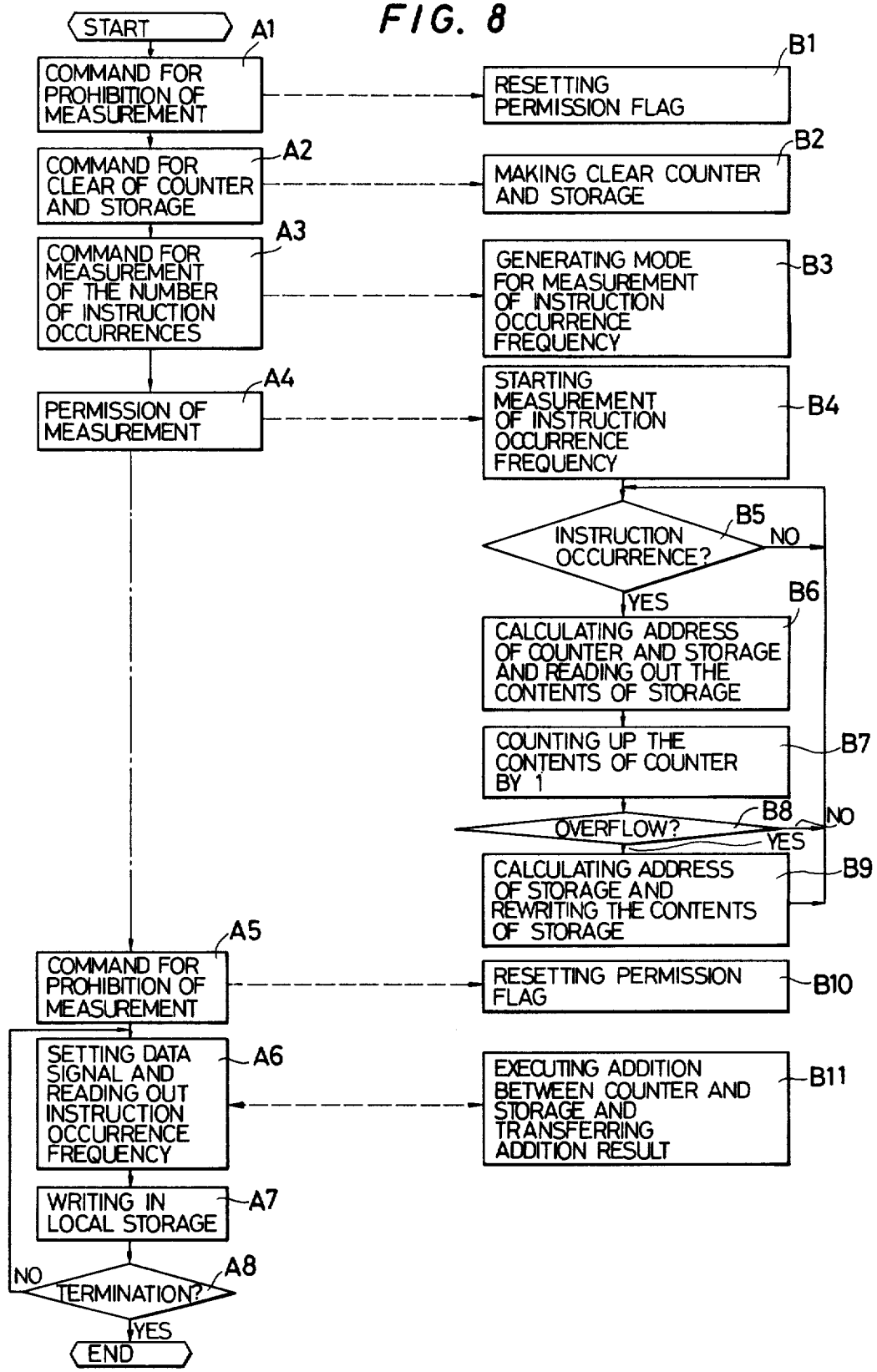

SYSTEM FOR GATHERING DATA REPRESENTING THE NUMBER OF EVENT OCCURRENCES

BACKGROUND OF THE INVENTION

The present invention relates to a system for gathering data representing the number of event occurrences in an electronic computer.

Recently, with the complication and the variety of computer art, it is necessary to improve the performance of programs executed by the computer and/or computer itself for high speed processing.

In order to improve the performance thereof, it is necessary to measure the present performance of an electronic computer system.

This measurement can be accomplished in a digital electronic computer by gathering data representing the number of executions of each of various kinds of instructions in programs or the number of occurrences of each of events corresponding to status changes occurring in the computer.

In a prior art gathering system, data is gathered such as the number of executed instructions and the number of memory requests by connecting measurement terminals of general counters with signal terminals derived from logic cards in the computer or by assembling counters in the computer.

A prior art system using such general counters has the following disadvantages.

(1) Gathered data become meaningless when the measurement terminals of the general counters are erroneously connected.

(2) In order to collect data of various kinds, the same processing must be repeated.

(3) It is impossible to collect a large amount of data at the same time.

(4) As logic circuits are formed with Large Scale Integration (LSI), the number of the signal terminals derived from the logic card is reduced. Therefore, desired signals for measurement are not obtained from the signal terminals.

On the other hand, in a case that counters are assembled in the computer, it is very expensive to provide a multiple of counters for counting the number of occurrences of each event. Furthermore, it is difficult to assemble such counters in the computer.

SUMMARY OF THE INVENTION

An object of the present invention is to provide a gathering system of simple construction which can accurately; gather a large amount of data in a short time.

In order to achieve this and other objects, the present invention is characterized by providing a gathering system comprising, means for detecting occurrences of each of a plurality of events, counter means for counting the lower digits of the number of the occurrences of each of the events, memory means for storing at least higher digits of the number of the occurrences thereof and means for gathering data representing the number of the occurrences from at least the memory means.

BRIEF DESCRIPTION OF THE DRAWINGS

FIG. 8 is a flow chart for explaining the operation of a processing unit and a specific controller shown in FIG. 1.

DETAILED DESCRIPTION OF THE PREFERRED EMBODIMENTS

Figure 1:
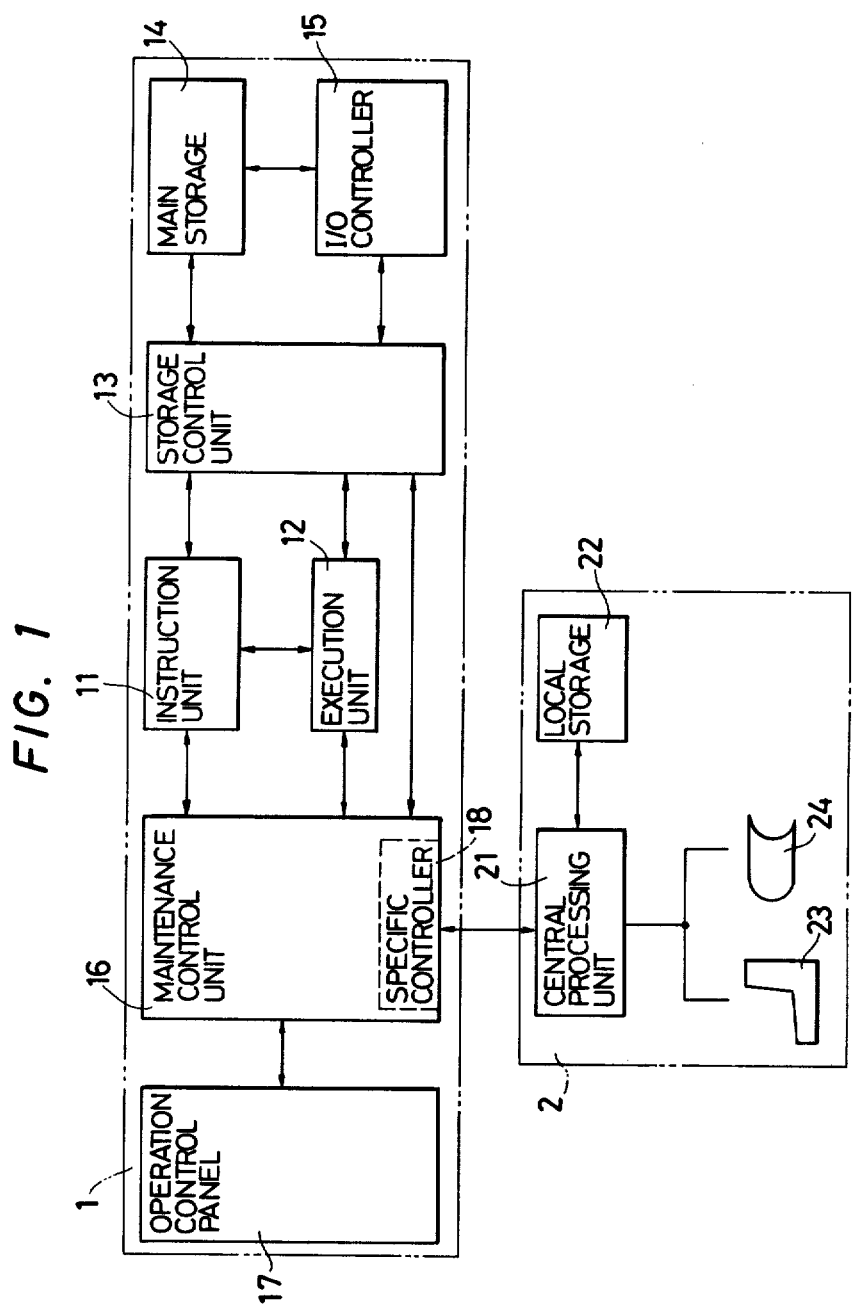
FIG. 1 is a circuit diagram showing an embodiment of a computer system including a gathering system according to the present invention.

FIG. 1 shows an embodiment of a computer system including a gathering system according to the present invention.

In FIG. 1, numeral 1 denotes an electronic computer system and numeral 2 designates a monitor electronic computer. In the electronic computer 1, numeral 11 denotes an instruction unit for performing advanced control and decoding of instructions, control of units and interruptions, numeral 12 an execution unit for executing instructions decoded by the instruction unit, numeral 13 a storage control unit which includes a high speed buffer storage with a small capacity and controls the reference to a main storage 14 and an I/O controller 15, numeral 16 a maintenance control unit for maintenance of a whole system, numeral 17 an operation control panel unit for the control of indicators and operation buttons and numeral 18 a specific controller provided according to the present invention.

In general, an instruction to be executed is read out from the main storage 14 and is decoded by the instruction unit 11, and data for instruction execution is read out from the main storage 14 by the instruction unit 11. The instruction is executed by the execution unit 12 and is then transferred through the storage control unit 13 to the main storage 14 for storing.

In the monitor electronic computer 2, numeral 21 designates a central processing unit comprising a small scale electronic computer, for example, a mini-computer or a micro-computer, numeral 22 a local storage, numeral 23 a console and numeral 24 an auxiliary storage.

In the central processing unit 21, data representing the number of event occurrences is gathered from the specific processor 18 and is processed with assistance of the local storage 22, the console 23 and the auxiliary storage 24.

Figure 2:
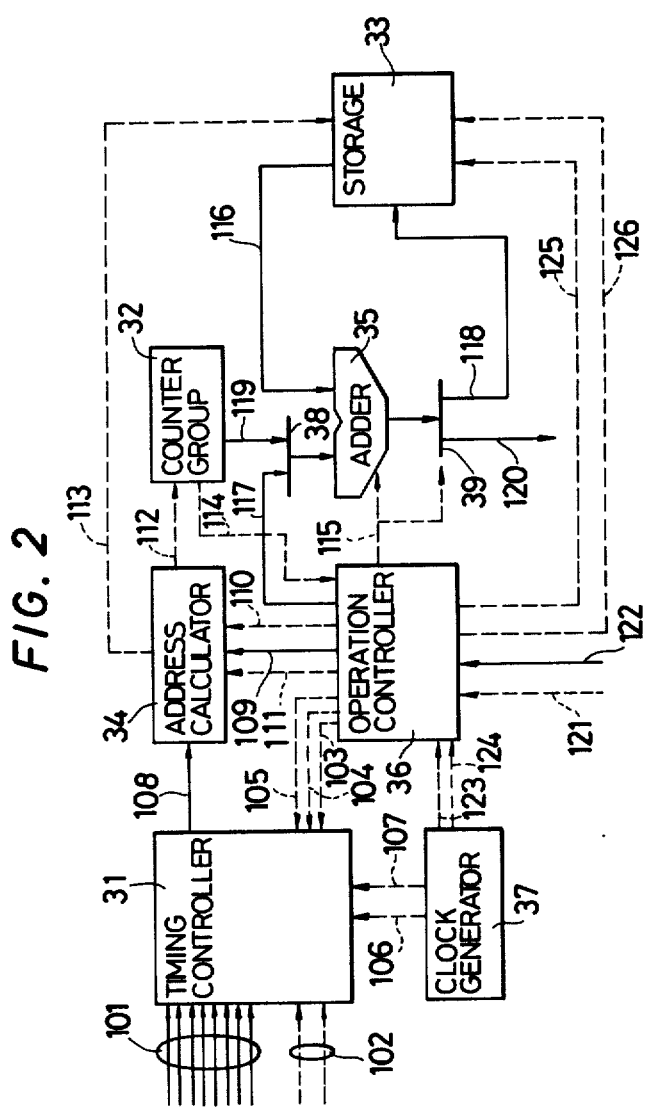
FIG. 2 is a circuit diagram illustrative of an embodiment of a portion of the gathering system shown in FIG. 1.

FIG. 2 shows an embodiment of concrete construction of the specific controller 18 shown in FIG. 1.

In FIG. 2, numeral 31 denotes a timing controller for adjusting the width of signals corresponding to the events which occurred in the electronic computer 1, numeral 32 a counter group comprising a plurality of counters, numeral 33 a storage unit, numeral 34 an address calculator for determining an address of the counter group 32 or the storage 33, numeral 35 an adder, numeral 36 an operation controller for decoding commands transferred from the processing unit 21 of the computer 2 and for controlling the timing controller 31, the address calculator 34, the counter group 32, the storage 33 and the adder 35, numeral 37 a clock generator and numerals 38 and 39 gates. Solid lines and dotted lines represent data lines and control lines, respectively. The operation of various portions in FIG. 2 is described below.

Clock Generator 37

The clock generator 37 generates clock signals shifted in phase to each other and transfers the clock signals to the timing controller 31 and the operation controller 36.

Timing Controller 31

Figure 3:
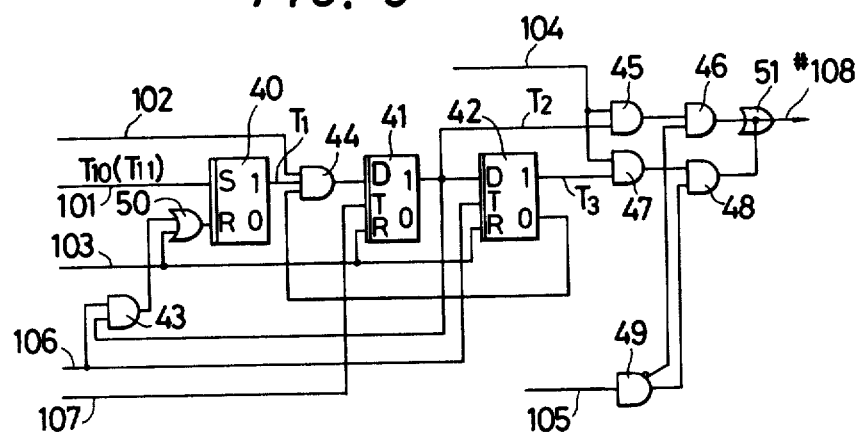
FIG. 3 is a circuit diagram showing an embodiment of a timing controller shown in FIG. 2.

FIG. 3 shows an embodiment of concrete construction of the timing controller 31.

Figure 4:
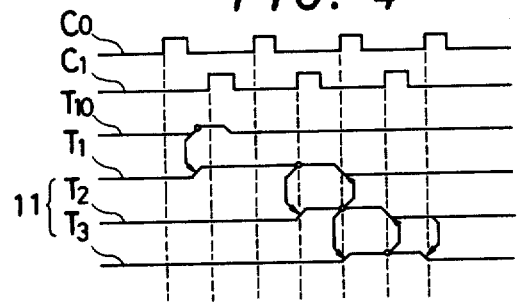
FIGS. 4 and 5 are timing charts for explaining the operation of the timing controller.
Figure 5:
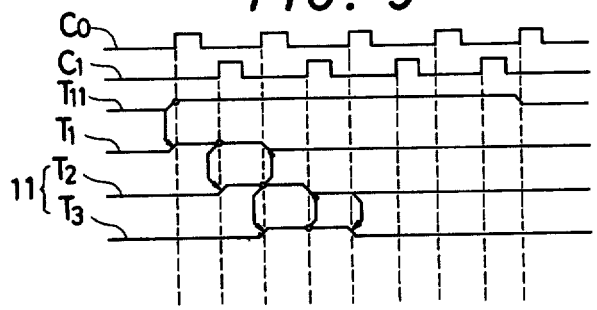

FIGS. 4 and 5 show timing charts for explaining the operation of the timing controller 31.

In FIG. 3, numerals 40 through 42 designates flip-flops, numerals 43 through 49 AND gates, numeral 50 an OR gate and numeral 51 a wired OR gate. Furthermore, numeral 101 designates a signal line for a signal representing an event occurred in the computer 1, numeral 102 a signal line for an enable signal indicating whether or not the corresponding event signal is valid, numerals 103 through 105 signal lines for control signals from the operation controller 36, numerals 106 and 107 signal lines for clock signals $C_0$ and $C_1$ from the clock generator 37 and numeral 108 a signal line for an output signal, connected to the address calculator 34. FIG. 3 shows only circuit for one event.

In FIGS. 4 and 5, $C_0$ and $C_1$ denote clock signals on lines 106 and 107, $T_{10}$ or $T_{11}$ an event signal occurred in the computer 1, and $T_1$, $T_2$ and $T_3$ output signals of the flip-flops 40, 41 and 42, respectively.

Signal $T_{10}$ or $T_{11}$ representing an event such as execution of a specific instruction, the acceptance of a memory request, the busy condition of execution unit 12, buffer cancel, etc. is transferred through the signal line 101 to the flip-flop 40. Furthermore, a signal indicating whether or not the corresponding signal $T_{10}$ or $T_{11}$ is valid is transferred through signal line 102 to the AND gate 44. When signal $T_{10}$ or $T_{11}$ is valid, the output signal $T_1$ of the flip-flop 40 is supplied through the AND gate 44 to the flip-flop 41. This flip-flop 41 is set at timing of clock signal $C_1$ on signal line 107. The output signal $T_2$ of the flip-flop 41 is applied to the flip-flop 42 and the AND gate 45. The flip-flop 42 is set at timing of the clock signal $C_0$ on the signal line 106 and the output signal $T_3$ of the flip-flop 42 is applied to the AND gate 47. When the flip-flop 41 is set, the flip-flop 40 is reset at timing of clock signal $C_0$. Furthermore, when the flip-flop 42 is set, the output signal of the AND gate 44 is absent.

In response to control signals on signal lines 104 and 105 from the operation controller 36, either one of signals $T_2$ and $T_3$ is outputted on the signal line 108 through the AND gates 45 through 48 and the wired OR gate 51.

Thus, in spite of the width of event signal $T_{10}$ or $T_{11}$, output signal $T_2$ or $T_3$ with constant width is obtained on the signal line 108. For example, the event signal $T_{10}$ with short width is expanded in width as in FIG. 4 and the event signal $T_{11}$ with-long width is shortened in width as in FIG. 5. The signal $T_3$ is shifted in phase with respect to the signal line $T_2$ and is used for address calculation when the output of the adder 35 is rewritten into the storage 33 in response to the overflow of counter 32 as described hereinafter. Therefore, by the control signal on the signal line 105, signal $T_3$ is transferred through the signal line 108 to the address calculator 34. Cycles of the clock signals $C_0$ and $C_1$ are determined by a machine cycle of the computer 1.

Address Calculator 34

Figure 6:
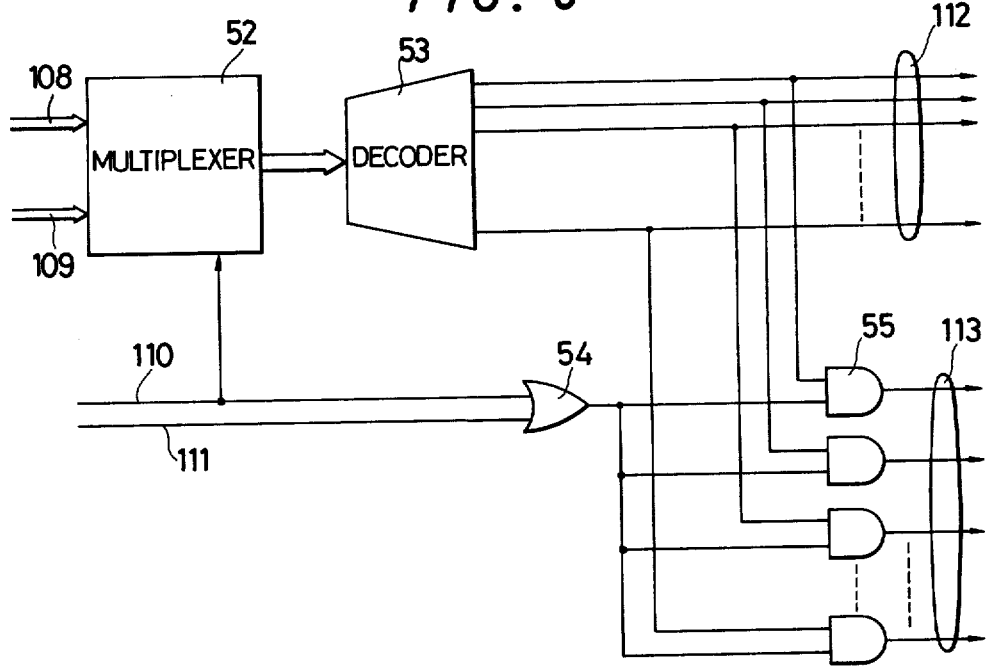
FIG. 6 is a circuit diagram showing an embodiment of an address calculator shown in FIG. 2.

FIG. 6 shows an embodiment of concrete construction of the address calculator 34.

In FIG. 6, numeral 52 denotes a multiplexer, numeral 53 a decoder, numeral 54 an OR gate and numeral 55 a group of AND gates, numeral 108 signal lines from the timing controller 31, numeral 109 signal lines for data signals from the operation controller 36, numerals 110 and 111 signal lines for control signals from the operation controller, and numerals 112 and 113 signal lines for address signals transferred to the counter group 32 and the storage 33.

Signals on signal lines 108 are transferred through the multiplexer 52 to the decoder 53 and are decoded by the decoder 53 to address signals for determining a specific counter 32. These address signals on the signal lines 112 are transferred to the counters 32.

Signals on the signal lines 109 are transferred from the processing unit 21 and correspond to address signals representing specific counters in the counter group 32. The signals on the signal lines 109 are transferred through the multiplexer 52 to the decoder 53 in response to the signal on the signal line 110. That is, signals on the signal lines 108 are decoded by the decoder 53 when a signal on the signal line 110 is "0" and signals on the signal lines 109 are decoded when a signal on the signal line 110 is "1". When this signal is "1", decoded signals are transferred through the AND gates 55 to the storage 33 as address signals. The contents of the storage 33 are read out from the storage 33 by the address signals and are applied to the adder 35.

When the contents of counter 32 are overflowed, the signal $T_3$ is applied on one of signal lines 108. In this case, output signals of the decoder 53 are transferred by the signal on the signal line 111 to the storage 33 as rewriting the address of the storage 33. In a case that execution frequency of each of n instructions is detected, the number of signal lines 108 or 109 is n.

Counter Group 32

Counter group 32 comprises a multiple of counters each of which has l bits and is operated in response to machine cycle time of the computer 1. When the counter with l bits is overflowed, a signal is transferred through the signal line 114 to the operation controller 36. This operation controller 36 has an output signal on a signal line 115 which controls the adder 35 to add the contents of the storage 33 transferred through the signal line 116 to a value 21 transferred through the signal line 117 and the gate 38. The outputs of the adder 35 are transferred through the gate 39 and a signal line 118 to the storage 33 and is written in the storage 33 by the address signal on the signal line 113.

Under the control of the processing unit 21, the contents of a counter of counter group 32 are transferred through a signal line 119 and the gate 38 to the adder 35 and are added to the contents of the storage 33. The addition result of the adder 35 is transferred through the gate 39 and a signal line 120 to the processing unit 21.

Storage 33

The storage 33 has memory areas for storing the addition result of the adder 35 and is operated by means of a normal memory access time which is longer than the operation time of the counter in counter group 32.

The number of bits of each memory area is K (where K is integer) times of that of the counter. Therefore, the number of the event occurrences can be measured until it reaches $2^{k \cdot l}$. The number of bits of each memory area may be Kl+m (where m is integer).

According to above-described construction, the following advantages are achieved:

(1) Since the operation of the counters in counter group 32 follow the high speed operation of the computer system 1, there is no possibility of influencing on the operation of the computer system.

(2) Since the number of bits of each counter is reduced remarkably, it is possible to assemble a multiple of counters in the computer system.

Although the result of the addition between the contents of the counter group 32 and the storage 33 is transferred to the processing unit 21, the copy of the contents of the counter group 32 may be written in the storage 33 so as to transfer only the contents of the storage 33 to the processing unit 21.

Adder 35

The adder 35 is operated under the control signal on the signal line 115. This control signal becomes "1" when there is performed the addition between constant value $2^l$ transferred from the operation controller 36 and the contents of the storage 33 at the overflow of a counter of the counter group 32 or when there is performed the addition between the contents of a counter of the counter group 32 and the storage 33 by the control of processing unit 21. When the addition is executed by the adder 35, the addition result is transferred through the signal lines 118 and 120 to the storage 33 and the processing unit 21, respectively. Data representing constant value $2^l$ corresponding to the full number of contents of the counter; are transferred through the signal line 117 to the adder 35 when the contents of the counter are overflowed.

Operation Controller 36

Figure 7:
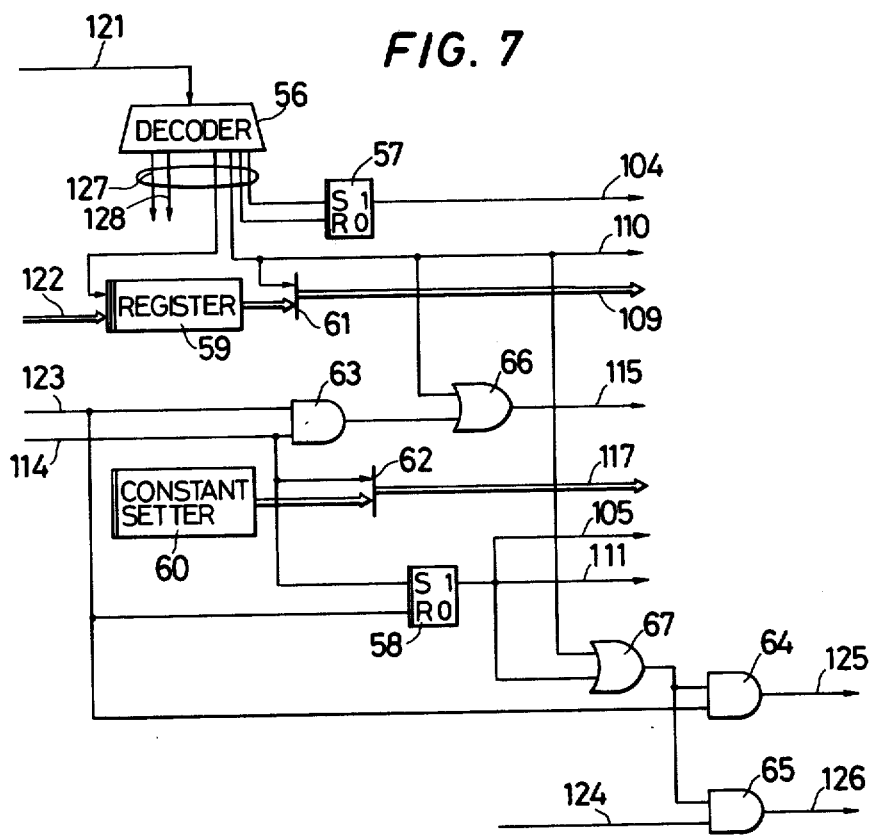
FIG. 7 is a circuit diagram showing an embodiment of an operation controller shown in FIG. 2.

FIG. 7 shows an embodiment of concrete construction of the operation controller 36.

In FIG. 7, numeral 56 represents a decoder for decoding a control signal transferred from the processing unit 21, numerals 57 and 58 flip-flops, numeral 59 a register, numeral 60 a constant setter, numerals 61 and 62 gates, numerals 63 through 65 AND gates and numerals 66 and 67 OR gates. Furthermore, numeral 121 denotes a signal line for a control signal transferred from the processing unit 21, numeral 122 signal lines for data signals transferred from the processing unit 21, numeral 123 a signal line for clock signal $C_0$ transferred from the clock generator 37, numeral 124 a signal line for clock signal $C_1$ transferred from the clock generator 37, numeral 125 and 126 signal lines for a read-out signal and a write-in signal transferred to the storage 33, respectively, and numerals 127 and 128 signal lines for control signals.

The control signal on the signal line 121 is decoded by the decoder 56 and is converted into various control signals. The flip flop 57 is set or reset in response to a control signal from decoder 56 and a measurement permission signal is then transferred through the signal line 104 to the timing controller 31.

A data signal representative of an address of the counter group 32 temporarily stored in the register 59 by a control signal from the decoder 56 and is further transferred through the gate 61 and the signal line 109 to the address calculator 34 by a control signal therefrom. At the same time, a control signal from the decoder 56 is transferred as a signal for controlling the decoding of the data signal to the address calculator 34. When the contents of the counter in the counter group 32 are overflowed, a signal is transferred from the counter group 32 to the AND gate 63 through the signal line 114.

The AND gate 63 is then opened by the clock signal on the signal line 123 and a signal for the operation of the adder 35 is then transferred through the OR gate 66 and the signal line 115 to the adder 35. A signal for the operation of the adder 35 is also transferred to the adder 35 by a control signal from the decoder 56.

Furthermore, a constant value $2^l$ set to the constant setter 60 is transferred through the gate 62 and the signal lines 117 to the adder 35 by the signal on the signal line 114. This constant value is added to the contents of the storage 33 by the adder 35 in response to the signal on the signal line 115.

The flip-flop 58 is set by the signal on the signal line 114 and the set signal of the flip-flop 58 is transferred through the signal lines 105 and 111 to the timing controller 31 and the address calculator 34, respectively. This flip-flop 58 is reset by the clock signal on the signal line 123. By the signals on the signal lines 105 and 111, an address signal for rewriting into the storage 33 is obtained in response to the signal T3 shown in FIGS. 4 and 5.

A read-out signal and a write-in signal are transferred through the signal lines 125 and 126, respectively, in response to a signal on the signal line 110, 105 or 111 and a clock signal on the signal line 123 or 124.

FIG. 8 is a flow chart for explaining the operation of the processing unit 21 and the specific controller 18 in a case where there is gathered the number of occurrences of each of specific instructions.

In FIG. 8, A1 through A8 are operation steps of the processing unit 21 and B1 through B11 are operation steps of the controller 18.

When a control signal for measurement prohibition request is transferred from the processing unit 21 to the operation controller 36 at a step A1, the flip-flop 57 corresponding to a permission flag in the operation controller 36 is reset at a step B1. When a control signal for the clear of the counter group 32 and the storage 33 is transferred from the processing unit 21 to the operation controller 18 at a step A2, the counters in the counter group 32 and memories in the storage 33 are made clear at a step B2. When a control signal for the measurement of the number of instruction occurrences is transferred at a step A3, a control signal for set of its mode is transferred through the signal lines 127 and 128 to the timing controller 31 and the address calculator 34, respectively, at a step B3.

When a control signal for measurement permission is transferred at a step A4, the flip-flop 57 is set so as to start the measurement at a step B4. When an instruction to be executed is generated at a step B5, an address corresponding to this instruction is calculated at a step B6 and the contents of a counter with the address are count up by 1 at a step B7. Whenever an instruction is executed, the contents of the corresponding counter are counted up.

When the contents of any one of the counters of counter group 32 is overflowed at a step B8, an address of the storage 33 is calculated and the addition result of the adder 35 is rewritten in the storage in response to this address at a step B9.

After a constant period, a control signal for measurement prohibition is supplied to the flip-flop 57 at a step A5 and this flip-flop 57 is reset at a step B10. Furthermore, steps A6 through A8 and B11 are repeated for gathering the number of executed instructions to the processing unit 21.

Thus, an address of the counter group 32 and the storage 33 is calculated in response to the data signal from the processing unit 21 and the contents of the counter group 32 and the storage 33 corresponding to this address, are added to each other and the addition result of the adder 35 is transferred through the signal line 120 to the processing unit 21 to store it in the local storage 22.

A gathering system according to the present invention can be used for gathering the number of occurrences of various events as well as instructions.

According to the above-described embodiments of the present invention, the following advantages can be obtained:

(1) Data representing the performance of an information processing device can be gathered without giving the influence on the processing device since the counters are operated at high speed.

(2) Since there are provided counters each having l bits and memories each having, for example, K×l bits, (a) a multiple of counters can be assembled per unit area and (b) the occurrence number of $2^{k \cdot l}$ can be counted.

(3) Gathered performance data can be automatically edited by the monitor computer.

We claim:

1. A gathering system in a data processing system comprising:
    detecting means for detecting occurrences of each of plural events;
    plural counter means connected with said detecting means, each of said counters counting the lower digits of number of occurrences of the corresponding events;
    storage means;
    adder means connected between said plural counter means and said storage means, for adding a first value to the contents of said storage means;
    control means connected with said counter means, said storage means and said adder means, for applying the first value and the contents stored in said storage means to said adder means when the count value of said counter means reaches the first value and for storing the addition result obtained by said adder means in said storage means so that the storage means stores the accumulated value of the number of event occurrences for each event; and
    processing means for analyzing data corresponding to the contents stored in said storage means.

2. A gathering system according to claim 1, in which said detecting means includes means for converting event occurrence signals into respective signals with constant pulse width and means for calculating an address for said counting means and said storage means in response to the signal converted by said converting means.

3. A gathering system according to claim 1, in which said processing means comprises means for analyzing data representing the addition result between the contents of said storage means and said counter means.

4. A gathering system according to claim 1, in which said control means is connected with said processing means and includes means for applying the first value corresponding to the count value of said counter means and the contents stored in said storage means to said adder means by a command from said processing means and transferring the addition result obtained by said adder means to said processing means.

5. A gathering system according to claim 1, in which said processing means includes means for generating control signals for controlling the operation of said detecting means, said counter means, said storage means, said adder means and said control means.

6. A gathering system according to claim 1, in which said counter means has only l bits for each event and said storage means has at least Kl bits for each event where each of K and l is an integer.

7. A gathering system according to claim 1, wherein each of said counter means operates in response to machine cycle time of said data processing system.

8. A gathering system in a data processing system comprising;
    detecting means for detecting occurrences of each of plural events;
    plural counter means connected with said detecting means for counting the number of occurrences of each event until the count value reaches a defined value;
    storage means connected with said plural counter means through an adding means, wherein said storage means stores the addition result from the adding means between a value corresponding to the defined value and the contents previously stored in the storage means when the count value of the counter means reaches the defined value so as to store the accumulated value of the number of the event occurrences therein; and
    processing means connected with said storage means, for analyzing data corresponding to the information stored in said storage means.

9. A gathering system in a data processing system comprising:
    a timing controller having a plurality of input lines coupled to a computer for providing data representing the occurrence of events in the computer, said timing controller providing output signals of a constant pulse width representative of the occurrence of events in the computer;
    an address calculator coupled to the timing controller output, said address calculator providing output address signals;
    a counter group comprising a plurality of counters coupled to the output of the address calculator, each of said counters counting the number of occurrences of a corresponding event by counting the representative output signals of the timing controller directed to each counter by the address calculator, said counters continuing to count until the count value reaches a defined integer value l said counter group including an output overflow line to indicate when individual counters reach the defined value l;
    storage means coupled to the output of the address calculator, said storage means comprising a plurality of memory areas having a bit capacity of Kl; where K is an integer;

an adder coupled to an output of the counter group and an output of the storage means, said adder having an output coupled to the storage means; and an operation controller coupled to the counter group output overflow line and the coupled inputs of the timing controller, the address calculator, the counter group, the storage means and the adder, said operation controller providing control signals in response to a signal received from the counter group output overflow line to add in the adder a value equal to the defined value 1 and the contents of the storage means and feed the addition result to the storage means.

* * * * *